(12) United States Patent
Usami (10) Patent No.: US 7,190,659 B2
(45) Date of Patent: Mar. 13, 2007

(54) OPTICAL INFORMATION RECORDING METHOD AND OPTICAL INFORMATION RECORDING MEDIUM

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 341 days.

(21) Appl. No.: 10/434,280

(22) Filed: May 9, 2003

(65) Prior Publication Data

US 2003/0210633 A1 Nov. 13, 2003

(30) Foreign Application Priority Data

May 9, 2002 (JP) .............................. 2002-133835

(51) Int. Cl.
*G11B 7/00* (2006.01)
*G11B 5/09* (2006.01)

(52) U.S. Cl. .................................... 369/116; 369/59.11

(58) Field of Classification Search ............. 369/59.11, 369/59.12
See application file for complete search history.

(56) References Cited

U.S. PATENT DOCUMENTS

| | | | |
|---|---|---|---|
| 5,818,808 A | 10/1998 | Takada et al. | |
| 6,160,784 A * | 12/2000 | Maeda et al. ................ | 369/116 |
| 6,222,814 B1 * | 4/2001 | Ichimura ..................... | 369/116 |
| 6,426,929 B1 | 7/2002 | Watabe et al. | |
| 6,459,666 B1 | 10/2002 | Yokoi | |
| 6,504,806 B1 * | 1/2003 | Nakajo ...................... | 369/59.12 |
| 6,611,484 B2 * | 8/2003 | Tsukamoto ............... | 369/59.11 |
| 6,631,109 B2 * | 10/2003 | Nakamura ............... | 369/59.11 |
| 6,891,790 B2 * | 5/2005 | Fukuzawa et al. ........ | 369/59.12 |
| 6,914,866 B2 * | 7/2005 | Narumi et al. ............ | 369/59.11 |
| 2002/0126604 A1 | 9/2002 | Powelson et al. | |

FOREIGN PATENT DOCUMENTS

| | | |
|---|---|---|
| EP | 0 851 413 A2 | 12/1997 |
| EP | 0 977 184 A2 | 2/2000 |
| JP | 2001-110053 A | 4/2001 |
| JP | 2001-126200 A | 5/2001 |
| WO | WO 98/36411 A2 | 8/1998 |

OTHER PUBLICATIONS

Japanese Office Action dated Nov. 14, 2006 issued in Japanese Patent Application No. 2002-133935.

* cited by examiner

*Primary Examiner*—William Korzuch
*Assistant Examiner*—Adam R. Giesy
(74) *Attorney, Agent, or Firm*—Sughrue Mion, PLLC (57) ABSTRACT

An optical information recording method of recording information on an optical information recording medium by irradiation of laser beam, the method comprises the steps of: forming a recording waveform which forms a first pit having a shortest pit length, by using a top pulse having a width narrower than a width of a channel clock cycle; forming a recording waveform which forms a second pit that is second shortest following the first pit, by using the top pulse and a terminal pulse having a width narrower than the width of the channel clock cycle; and forming a recording waveform which forms a pit that is longer than the second pit, by using the top pulse, the terminal pulse, and at least one multipulse formed between the top pulse and the terminal pulse. According to the method described above, pits having stable shape can be formed and thus jitter of reproduced signals can be reduced in an optical information recording medium having a narrow track pitch and high recording density.

22 Claims, 6 Drawing Sheets

Table $T_{top}$ Width (×T)

| Preceding Space Interval | Signal Length | | | | | | |
|---|---|---|---|---|---|---|---|
| | 2T | 3T | 4T | 5T | 6T | 7T | 8T |
| 2T | 0.84 | 0.68 | 0.55 | 0.35 | 0.36 | 0.32 | 0.35 |
| 3T | 0.86 | 0.69 | 0.56 | 0.4 | 0.38 | 0.38 | 0.38 |
| 4T | 0.87 | 0.69 | 0.57 | 0.42 | 0.42 | 0.40 | 0.40 |
| 5T | 0.89 | 0.71 | 0.58 | 0.43 | 0.43 | 0.43 | 0.45 |
| 6T | 0.89 | 0.71 | 0.58 | 0.45 | 0.45 | 0.45 | 0.48 |
| 7T | 0.89 | 0.71 | 0.58 | 0.45 | 0.45 | 0.45 | 0.48 |
| 8T | 0.89 | 0.71 | 0.58 | 0.45 | 0.45 | 0.45 | 0.48 |

OPTICAL INFORMATION RECORDING METHOD AND OPTICAL INFORMATION RECORDING MEDIUM

BACKGROUND OF THE INVENTION

1. Field of the Invention

The present invention relates to an optical information recording method and an optical information recording medium containing information recorded by the optical information recording method.

2. Description of Related Art

In an optical information recording medium (recordable optical recording medium), such as a DVD-R or DVD-RW, information is recorded by forming pits.

In information recording, submicron-order pits generated by thermal recording need to be recorded with high accuracy. Therefore, laser pulse control, called a "write strategy" (or, "recording strategy"), is employed for recording the pits. The recording strategy has various functions. In one example, when forming a pit with continual power application corresponding to the length of the pit, the strategy corrects an undesirably long pit resulting from residual heat of a laser beam. In another example, the strategy corrects pit-length nonuniformity caused by signal combination and/or differences in characteristics of the recording layers. In short, the recording strategy is carried out so that proper signals can be reproduced in a replay operation.

Figure 5:
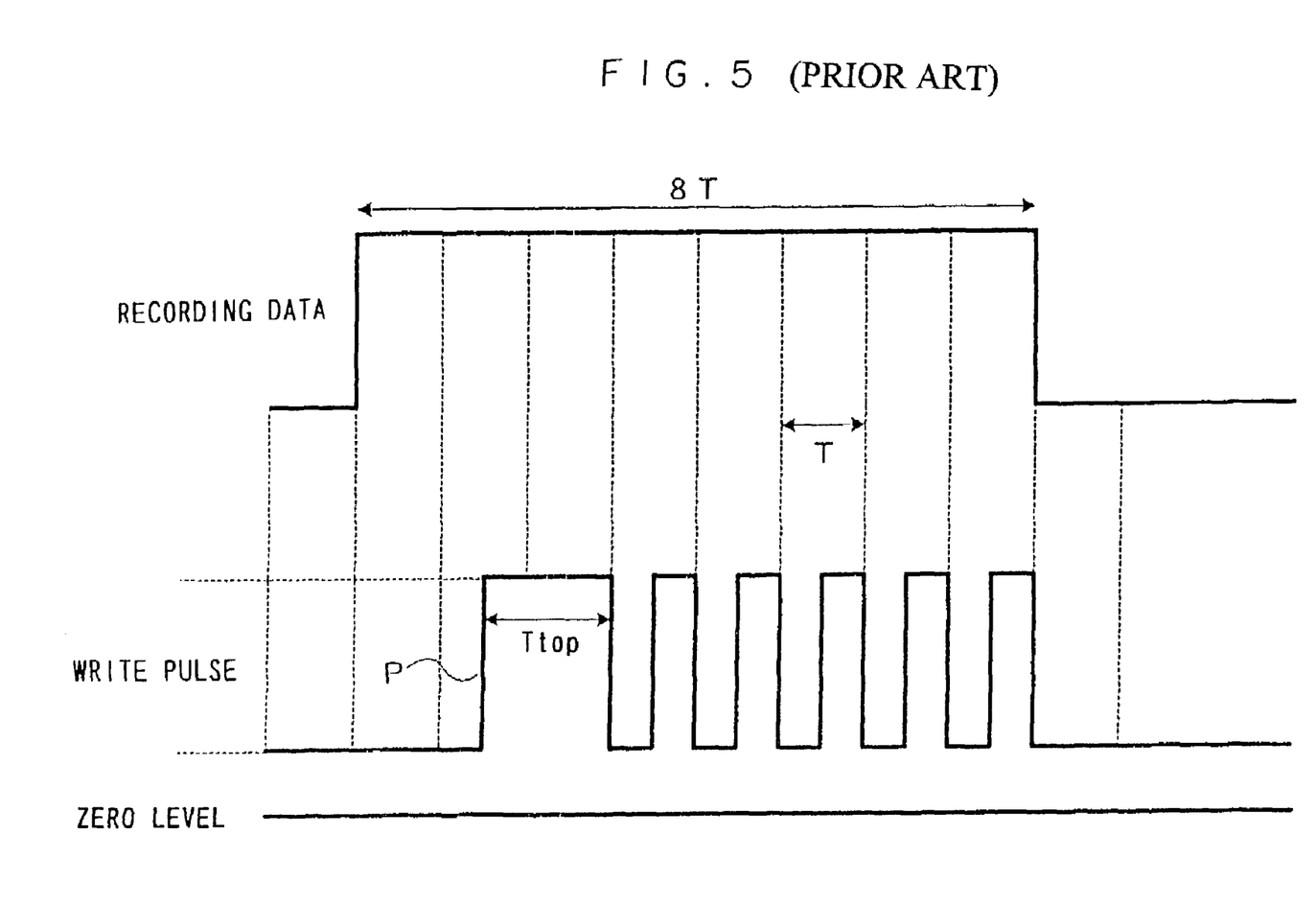
FIG. 5 is a waveform diagram of a recording laser beam of a conventional example.

As shown in FIG. 5, pit-forming portion P is, for example in an 8T signal, formed such that a front edge is 1T or more behind the rise of recording data (recording signal), and is formed of a top pulse having a relatively large pulsewidth and five multipulses each having a pulsewidth narrower than the top pulse. That is, a write pulse is generally thus formed.

The recording strategy described above is suitably used in optical-information recording for a medium such as a DVD. However, problems arise with the recording strategies in terms of their adaptability to a high-recording-density optical information recording medium that has track pitches narrower than a DVD. Specifically, when the recording strategy is applied to such a high-recording-density optical information recording medium as described above, desired recording pits are less likely to be formed and deterioration in recording characteristics, such as increase in jitter, is observed.

SUMMARY OF THE INVENTION

The present invention has been developed to solve the problems described above. Therefore, an object of the invention is to provide an optical information recording method of forming pits of steady shapes and reducing jitter of a reproducing signal in a high-recording-density optical information recording medium that has track pitches narrower than conventional DVD. Another object of the invention is to provide an optical information recording medium containing information recorded by the optical information recording method.

To solve the problems described above, the inventor carried out researches and investigations regarding the reason why the conventional recording strategy for DVD cannot successfully be applied to a high-recording-density optical information recording medium that has track pitches narrower than conventional DVD. As a result, it was found that the inter-pit pitch is narrow at a portion with a high recording density, in which, when subsequently forming a pit after having formed one pit, residual heat from the previous pit formation thermally interferes the subsequent pit formation, thereby making it difficult to form a desired pit. On the basis of this discovery, the inventor of the invention have reached the present invention summarized below.

That is, the invention has aspects (1) to (5) described hereunder.

(1) An optical information recording method of recording information on an optical information recording medium by irradiation of laser beam, the method comprising the steps of: forming a recording waveform which forms a first pit having a shortest pit length, by using a top pulse having a width narrower than a width of a channel clock cycle; forming a recording waveform which forms a second pit that is second shortest following the first pit, by using the top pulse and a terminal pulse having a width narrower than the width of the channel clock cycle; and forming a recording waveform which forms a pit that is longer than the second pit, by using the top pulse, the terminal pulse, and at least one multipulse formed between the top pulse and the terminal pulse.

(2) The optical information recording method described in (1), further comprising a step of setting a total number of the top pulse, the terminal pulse, and the at least one multipulse at n−1, when a pit having a pit length of nT is formed, wherein "n" represents an integer in a range from 2 to 8 and "T" represents the channel clock cycle.

(3) The optical information recording method described in (1) or (2), wherein, among top pulses of pits, a width of a top pulse having a shortest pulsewidth is in a range of 20% to 70% of a width of a top pulse having a longest pulsewidth.

(4) The optical information recording method described in any one of (1) to (3), wherein, when "L" represents an interval between pits to be formed, a width of one top pulse, immediately before which a width of the interval L is shortest among the intervals, is in a range of 1% to 50% of a width of another top pulse, immediately before which a width of the interval L is longest among the intervals.

(5) An optical information recording medium contains information recorded by the optical information recording method described in any one of (1) to (4).

BRIEF DESCRIPTION OF THE DRAWINGS

FIGS. 2A to 2C show each an example waveform diagram (recording strategy) of recording laser beam according to the embodiment, in which

DETAILED DESCRIPTION OF THE PREFERRED EMBODIMENT

Figure 1:
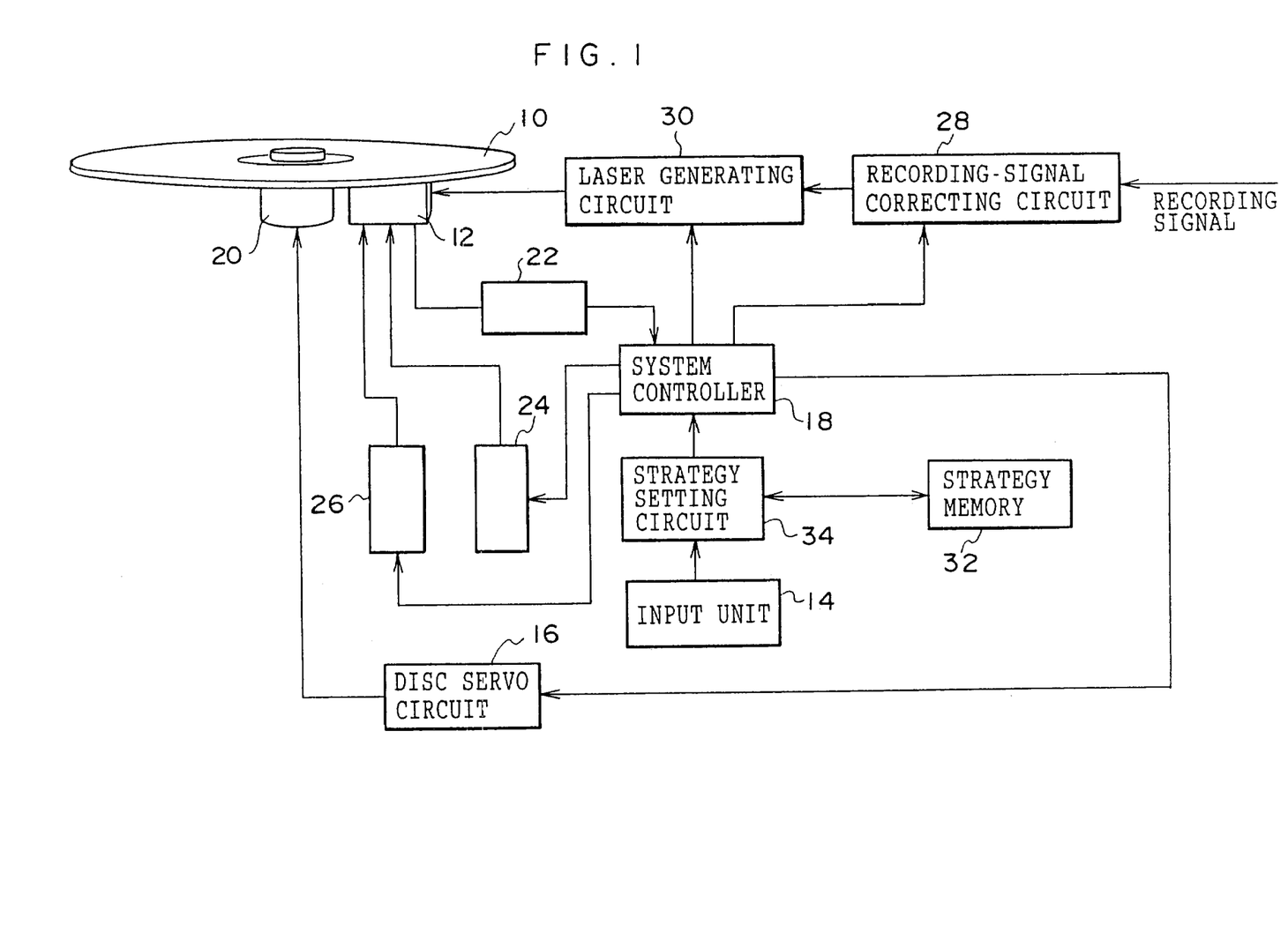
FIG. 1 is a block diagram of an embodiment according to the present invention.

Hereinafter, an embodiment of the present invention will be described with reference to the accompanying drawings. FIG. 1 is a block diagram of an optical disc recording/replaying apparatus to which the embodiment is adaptable.

As shown FIG. 1, an optical head 12 is disposed on the side of light incident surface (the side on a covering layer) of an optical disc 10, which is an optical information recording medium of, for example, a write-once type or a rewritable type. The optical head 12 is formed of components including a recording semiconductor laser and a plurality of optical detectors. The optical disc recording/replaying apparatus includes an input unit 14 provided that allows a user to set recording rate scaling factors (such as 1×, 2×, 3×, 4×, etc.) magnification.

The input unit 14 is connected to a strategy setting circuit 34. The circuit 34 performs readout a plurality of strategies (time modulation amounts, recording powers, and the like) that are stored into a record-strategy memory 32 according to the data length of a recording signal. Concurrently, the strategy setting circuit 34 sets into a system controller 18 a plurality of recording strategies according to the recording-speed scaling factor that has been input from the input unit 14.

The system controller 18 is connected to a disc servo circuit 16. The disc servo circuit 16 controls the rotation of a disc motor 20 at the recording rate scaling factor set by the input unit 14, such that the linear velocity is constant, on the basis of a control signal from the system controller 18. The linear velocity can controllably be made constant in the following manner that: a wobble is detected from an output signal of the optical detector of the optical head 12; and the disc motor 20 is PLL-controlled so that the wobble is detected at a predetermined frequency.

The output signal of the optical detector of the optical head 12 is input to the system controller 18 via an RF amplifier section 22. This amplifier section 22 has a focus-error-signal generating circuit and a tracking-error-signal generating circuit.

The system controller 18 outputs to a focus and a tracking circuit 24 commands in response to a focus error signal and a tracking error signal. In response to the individual commands from the system controller 18, the focus and the tracking circuit 24 performs control of the focus and tracking of laser beam having a wavelength of 500 nm or less, which is outputted from, for example, the semiconductor laser in the optical head 12.

The aforementioned tracking control is performed by detecting a pregroove formed over the optical disc. The laser beam is irradiated from the covering side of the optical information recording medium.

Examples of the laser source having an oscillatory wavelength of 500 nm or less include a blue-violet semiconductor laser having an oscillatory wavelength in a range of, for example, from 390 nm to 415 nm. Another example is a blue-violet SHG laser having a central oscillatory wavelength of approximately 430 nm.

The numerical aperture (NA) of an objective lens used for a pickup unit is preferably 0.7 or higher and more preferably 0.85 or higher to increase the recording density.

The system controller 18 is connected to a feed servo circuit 26. The feed servo circuit 26 controls a feed motor in response to the command issued from the system controller 18, and thereby causes the optical head 12 to move in a radial direction of the disc 10.

The recording signal (recording data) for recording information to the optical disc 10 is generated as a serial data signal having a standardized format and a transfer rate in accordance with the inputted recording rate scaling factor, from the inputted data to which an error check code, subcode information and the like are provided by a recording-signal generating circuit (not shown). The recording signal is then inputted to a recording-signal correcting circuit 28. The recording signal thus inputted to the circuit 28 is then modulated according to the data length by the recording strategy, which has been set according to the recording rate scaling factor input from the input unit 14. Then, the modulated recording signal is input to a laser generating circuit 30. In response to the corrected recording signal, the laser generating circuit 30 drives a semiconductor laser of the optical head 12 to cause the recording surface of the optical disc 10 to be irradiated with a laser beam. Thereby, a pit is formed, and the recording signal is recorded thereinto. In this case, an auto-power control circuit is used to control the laser power to be at the level of the target power. The recording signal is preferably recorded through pulse length modulation.

Subsequently, recording strategies recorded in a record-strategy memory 32 will be described hereinafter with reference to FIG. 2.

Figure 2A:
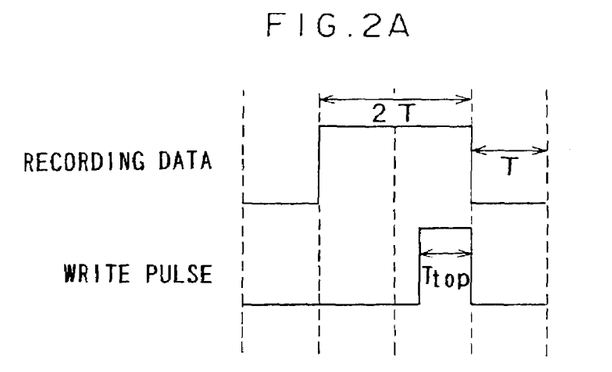
FIG. 2A shows a 2T signal.

As shown in FIG. 2A, a recording strategy (recording waveform) for recording, for example, a 2T signal corresponding to a shortest pit (first pit), is formed of a top pulse $T_{top}$ having a width narrower than a width of a channel clock cycle T. ("a width of a channel clock cycle T" will occasionally be referred to as simply "T", hereinafter).

Figure 2B:
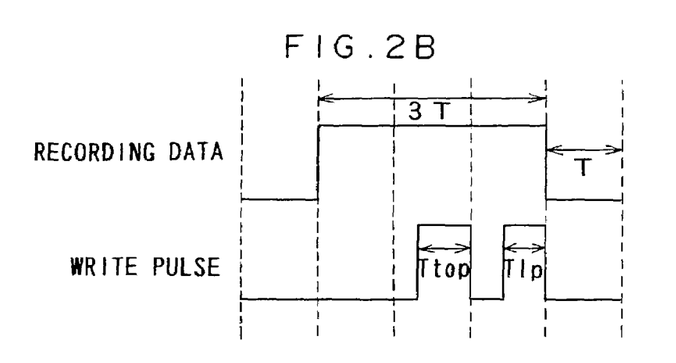
FIG. 2B shows a 3T signal.

As shown in FIG. 2B, a recording strategy used to record, for example, a 3T signal corresponding to a second-shortest pit (second pit), which is second-shortest following the shortest pit, is formed of the top pulse $T_{top}$ and a terminal pulse $T_{lp}$ whose width is narrower than the width of the channel clock cycle T.

Further, a recording strategy used to form record a signal (for example, a 4T–8T signal) corresponding to a pit longer than the pit corresponding to the second pit is formed of the top pulse $T_{top}$, the terminal pulse $T_{lp}$, and at least one multipulse $T_{mp}$ formed between the pulses $T_{top}$ and $T_{lp}$. For example, as shown in FIG. 2C, in a recording strategy for forming an 8T signal, a top pulse $T_{top}$ is first formed in a 2T signal, five pulses $T_{mp}$ are formed thereafter, and then the last pulse $T_{lp}$ is formed.

Figure 2C:
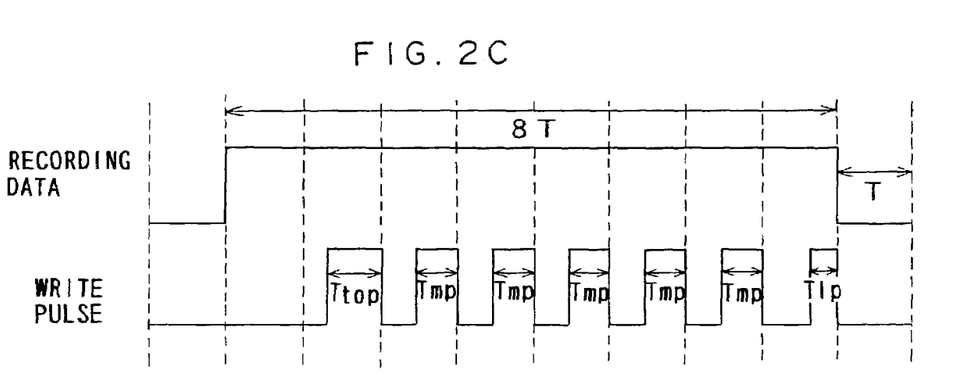
FIG. 2C shows an 8T signal.

By forming the top pulse $T_{top}$ to have the width narrower than the width of the channel clock cycle T, as shown in FIGS. 2A to 2C, the inter-pit thermal interference (inter-symbol thermal interference) is reduced. Thereby, pits having stable shape can be formed on the optical information recording medium having a narrower track pitch and higher recording density than the conventional DVDs. As a result, jitter of reproduced signals can be significantly reduced in such a recording medium.

Hereinafter, "n" will represent an integer in a range of 2 to 8, and "T" will represent the channel clock cycle, in the recording strategy of the invention. In the recording strategy of the present invention, when pits having a length of nT are formed, the total number the top pulse $T_{top}$, terminal pulse $T_{lp}$, and multipulses $T_{mp}$ is preferably n−1.

Depending on the modulation method, however, the shortest pulse is not always 2T, and the longest pulse is not always 8T.

The width of $T_{top}$ must be smaller than T. Specifically, the width of $T_{top}$ is preferably 0.9T or smaller, and more preferably 0.85T or smaller.

The lower limit of the width of $T_{top}$ is preferably 0.1T or larger, more preferably 0.2T or larger, and further more preferably 0.3T or more. Meanwhile, as shown in FIGS. 2A to 2C, $T_{top}$ is formed in the initial 2T.

As shown in FIGS. 2A to 2C, it is preferable that the width of the top pulse $T_{top}$ having the shortest pulsewidth, among top pulses $T_{top}$ of respective pits, is in a range of 20% to 70% of the width of the top pulse $T_{top}$ having the longest pulsewidth.

By setting the range as described above, the influence of the thermal-interference is suppressed and the jitter is reduced in an effective manner.

The upper limit of the aforementioned range is preferably 70%, more preferably 60% or lower, further more preferably 55% (or lower). The lower limit of the aforementioned range is preferably 20%, more preferably 30% or higher, further more preferably 35% or higher.

From the viewpoints of suppressing the thermal-interference influence and the integrated radiance power of the laser, the width of each of the multipulses $T_{mp}$ formed in the 3T or longer signal is preferably in a range of 0.4T to 0.84T, more preferably in a range of 0.5T to 0.8T, and further more preferably a range of 0.6T to 0.78T. One multipulse $T_{mp}$ may be formed in units of one cycle T (1T), the widths of the multipulses $T_{mp}$ may either be identical to one another or be different from one another.

From the viewpoints of suppressing the influence of the thermal-interference and thus enhancing the power of the integrated radiance of the laser, the width of the terminal pulse $T_{lp}$ formed in the 2T or longer signal needs to be indispensably narrower than 1. However, the width is preferably in a range of 0.1T to 0.8T, and more preferably in a range of 0.3T to 0.7T.

Figure 3:
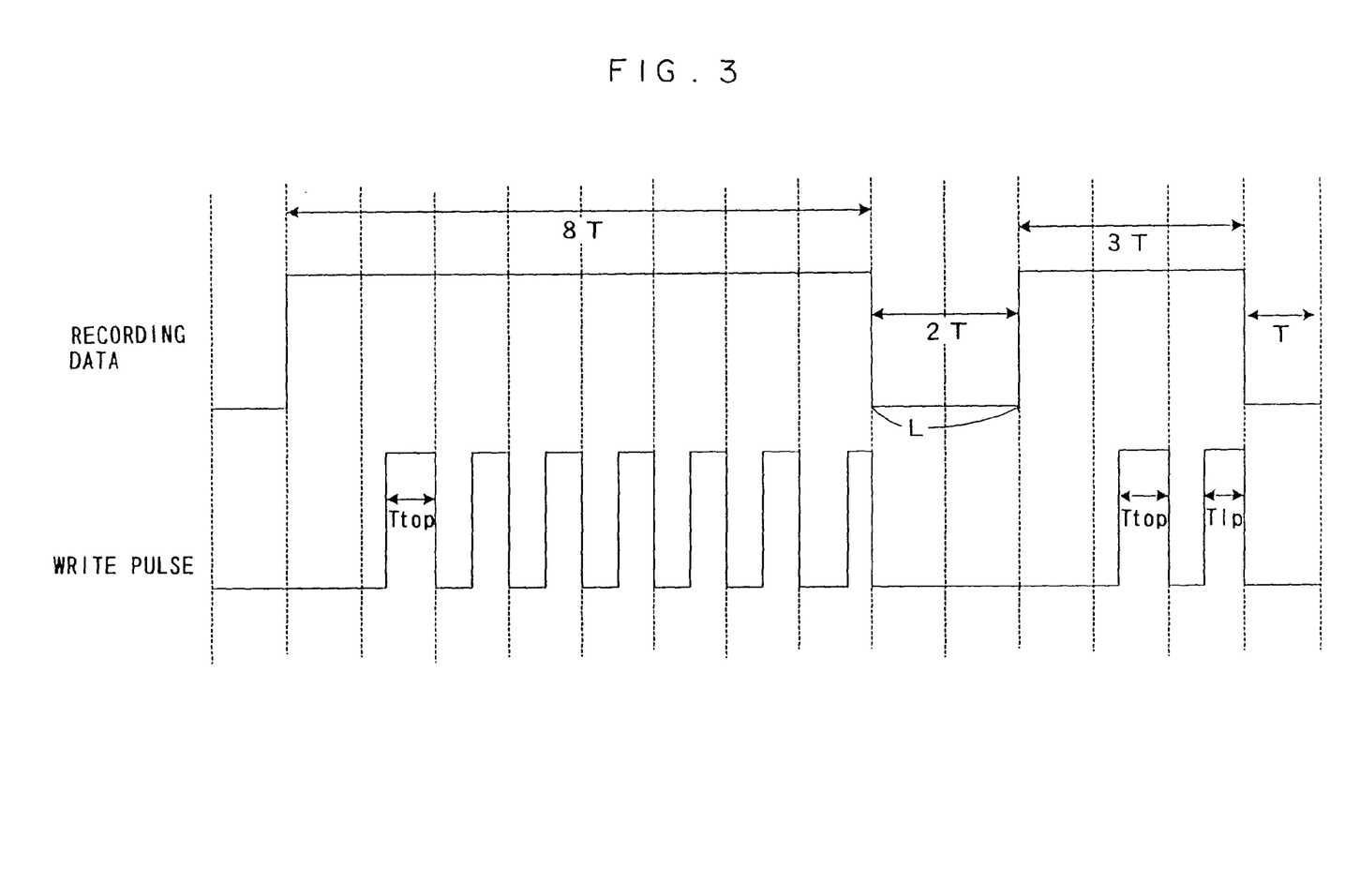
FIG. 3 is another example of waveform diagram of a recording laser beam according to the embodiment.

As shown in FIG. 3, when "L" represents an interval between pits to be formed (in FIG. 3, the interval L corresponds to 2T), a width of one top pulse, the width of the interval L immediately before which one top pulse is shortest among the "L" intervals, is in a range of 1% to 50% of a width of another top pulse, the width of the interval L immediately before which another top pulse is longest among the "L" intervals.

By setting the range as described above, the influence of the thermal-interference is reduced and thus jitter is reduced.

With regards to the aforementioned range, a more preferable range is between 2% and 40%, and an even more preferable range is between 3% and 35%.

In addition, when "L" represents an interval between pits formed in a recording strategy, the width of a terminal pulse $T_{lp}$ of one pit immediately before the minimum interval L is preferably in a range of 1% to 50% of the width of a terminal pulse $T_{lp}$ of another pit immediately before the maximum interval L.

By setting the aforementioned range as described above, the influence of the thermal-interference is reduced and thus and jitter is reduced.

With regards to the aforementioned range, a more preferable range is between 2 and 30%, and an even more preferable range is between 3% and 20%.

Like the multipulse $T_{mp}$, one terminal pulse $T_{lp}$ is formed within one cycle T (1T) as a unit.

In the recording strategy described above, it is preferable that the jitter is reduced by changing the individual positions of, for example, the front end and the rear end (terminal end) of the pulses.

According to the present embodiment, when a recording rate scaling factor is input from the input unit 14, the strategy setting circuit 34 reads out, for example, a 2T–8T recording strategy from the record-strategy memory 32. Then, the strategy setting circuit 34 assigns thereto a value of T corresponding to the recording rate scaling factor, and sets the recording strategy, which corresponds to the assigned value of the recording rate scaling factor, in the system controller 18. In response to the recording strategy that has been set, the system controller 18 controls the recording-signal correcting circuit 28 to apply modulation to the length of a pit formation portion of the recording signal. Concurrently, in response to the set recording strategy, the system controller 18 controls the laser generating circuit 30 to modulate the laser power in terms of intensity. Thereby, the pit formation portion and a land formation portion of the optical disc are irradiated with laser beam having a power of a shape similar to the recording strategy. Further, the system controller 18 controls the disc servo circuit 16 to perform rotation control of the disc motor 20 so that the disc motor 20 is rotated at a speed corresponding to the recording rate scaling factor which has been commanded.

The modulation method is carried out such that the shortest pit length is no larger than 2.5 times, more preferably no larger than 2.3 times, and further more preferably no larger than 2.1 times as much as the channel clock cycle T. As a lower limit, the length is preferably at least 0.5 times, more preferably at least 0.8 times, and further more preferably at least 1.2 times as much as the channel clock cycle T.

The recording rate is preferably at least 3.8 m/s, more preferably at least 4.2 m/s, and further more preferably at least 4.5 m/s. As an upper limit of the recording rate, the rate is preferably at least 40 m/s, more preferably least 22 m/s, and further more preferably least 12 m/s.

Optical information recording media adaptable to the optical information recording method of the invention are not specifically limited as long as they are of the type recordable with laser beam of 500 nm or less (preferably in a range of 350 nm to 500 nm). The medium may be any one of a phase change type, photomagnetic type and dye type. The medium may be either rewritable type or write-once type. However, an optical information recording medium of a write-once dye type is most preferably adaptable.

Hereinafter, the configuration of a write-once dye type optical information recording medium will be described as a specific example of the optical information recording medium.

The optical information recording medium preferably has a structure in which at least a light reflecting layer, a recording layer, a covering layer are sequentially formed over a substrate. The covering layer is preferably formed over the recording layer via an adhesive layer.

It should be noted, however, that the present invention is not limited to the aforementioned structure of the optical information recording medium.

(Substrate)

The substrate may be formed from a material optionally selected from various materials used as substrate materials of conventional optical information recording media.

Specific examples of the usable material include: glass; acrylic resins such as polycarbonate and polymethyl methacrylate; polyvinyl-chloride based resins such as polyvinyl chloride and vinyl chloride copolymer; an epoxy resin; an amorphous polyolefin; a polyester; and metal such as aluminum. Alternatively, these materials may be used in the form of combinations when desired.

Among the aforementioned materials, the polycarbonate and the amorphous polyolefin are preferable and the polycarbonate is more preferable from the viewpoints of moisture resistance, dimensional stability, and/or cost reduction. The substrate is preferably formed to a thickness of 1.1±0.3 mm.

Tracking guide grooves or irregularities (grooves) representing information such as address signals are formed over the substrate. To achieve even higher recording density, it is preferable to use a substrate on which grooves with even narrower track pitches, as compared to a CD-R, DVD-R or the like, are formed. The track pitches of the grooves need to be generally in a range of 200 μm to 400 μm, and preferably in a range of 250 μm to 350 nm. The depth of the grooves (groove depth) needs to be generally in a range of 20 nm to 150 nm, and is preferably in a range of 50 nm to 100 nm.

The width of the grooves is preferably in a range of 50 nm to 250 nm, and more preferably in a range of 100 nm to 200 nm. The slope angle of the grooves is preferably in a range of 20° to 80°, and more preferably in a range of 30° to 70°.

Figure 4:
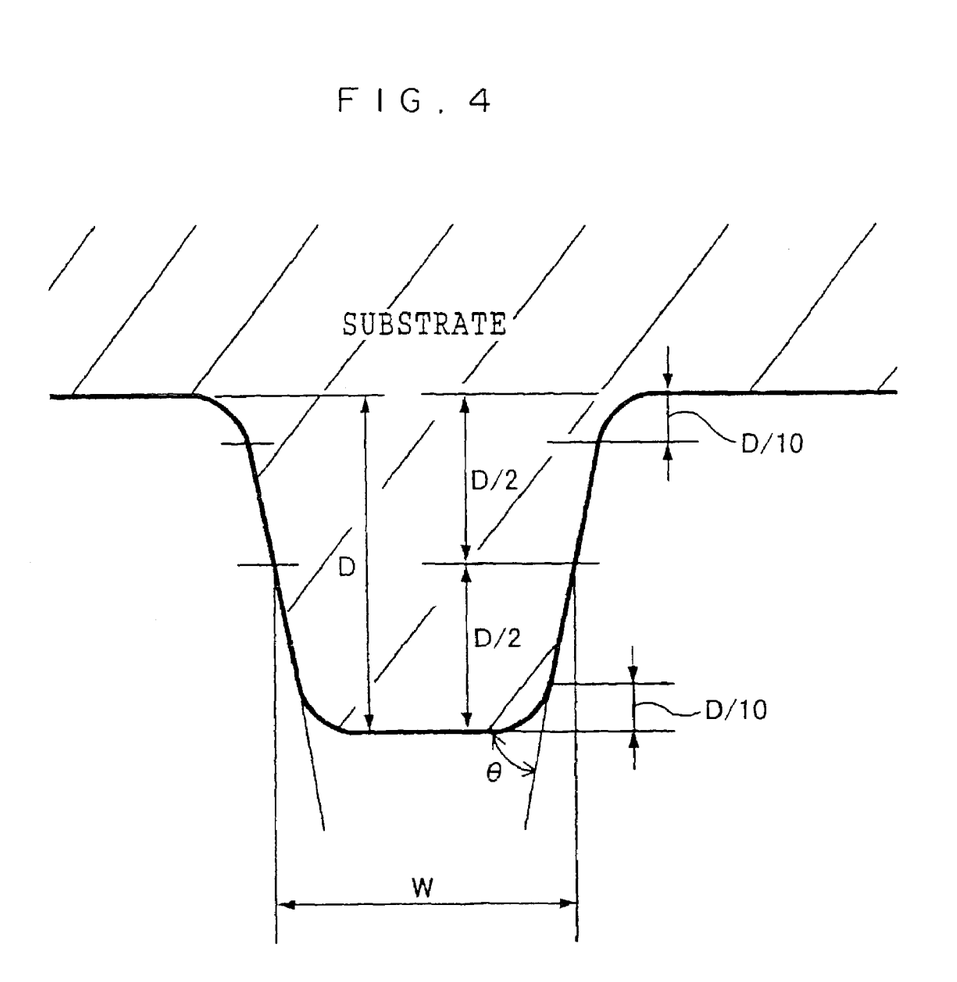
FIG. 4 is an explanatory partial cross-sectional view showing a shape of a groove of a substrate.

FIG. 4 is a schematic cross-sectional view showing the groove shape. As defined in the drawing, a groove depth D is the distance between the surface of the substrate before the groove is formed (which surface will be referred to as "the pre-grooving substrate surface" hereinafter) and the deepest portion of the groove. A groove width W is the width of the groove at a depth of D/2. A groove slope angle θ is the angle formed between the substrate surface and a straight line linking a position on the groove slope distanced from the pre-grooving substrate surface by D/10, with a position on the groove slope distanced from the deepest portion of the groove by D/10. These values are measurable by using an AFM (atomic force microscope).

A primer layer is preferably formed over the substrate surface on a side thereof on which a light reflecting layer described below is provided. The undercoat layer is preferable because it improves the flatness of the surface and enhances adhesion between the layers.

Examples of the material usable to form the primer layer include polymer substances and surface modifying agents. Examples of the polymer substances include polymethyl methacrylate, an acrylic acid-methacrylic acid coplymer, a styrene-maleic anhydride copolymer, a polyvinyl alcohol, a N-methylol acrylamide, a styrene-vinyl toluene copolymer, a chlorosulfonated polyethylene, nitrocellulose, a polyvinyl chloride, a chlorinated polyolefin, a polyester, a polyimide, a vinyl acetate-vinyl chloride copolymer, an ethylene-vinyl acetate copolymer, a polyethylene, a polypropylene, and a polycarbonate. Examples of the surface modifying agents include a silane coupling agent.

The primer layer can be formed by: preparing a coating solution by dissolving or dispersing the aforementioned material in an appropriate solvent; and coating the coating solution on the substrate surface according to a known coating method such as spin coating, dip coating and extrusion coating. The thickness of the primer layer is generally in a range of 0.005 μm to 20 μm, and preferably in a range of 0.01 μm to 10 μm.

(Light Reflecting Layer)

For the light reflecting layer, a light reflective substance having high reflectance with respect to the laser beam is used. The reflectance is preferably 70% or higher.

Examples of the high-reflectance substances include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. These reflective substances may be used solely or in combination of two or more different ones, or in the form of an alloy thereof. Among these substances, Cr, Ni, Pt, Cu, Ag, Au, Al, and stainless steel are preferable. Au, Ag, and Al or an alloy thereof is particularly preferable; and Au and Ag or an alloy thereof is most preferable.

The light reflecting layer can be formed over the substrate by performing, for example, vapor deposition, sputtering, or ion plating for the light reflective substance described above. The thickness of the light reflecting layer is generally in a range of 10 nm to 300 nm and preferably in a range of 50 nm to 200 nm.

(Recording Layer)

The recording layer is formed over the light reflecting layer, can be recorded with laser beam having a wavelength of 500 nm or less, and contains dyes. The dyes as the recording substance contained in the recording layer may be either a phase-changing metallic compound or an organic compound.

Specific examples of the organic compound include a cyanine dye, an oxonol dye, a metallic-complex base dye, an azo dye, and a phthalocyanine dye.

Examples of the dyes which can be suitably used further include those disclosed in Japanese Patent Application Laid-Open (JP-A) Nos. 4-74690, 8-127174, 11-53758, 11-334204, 11-334205, 11-334206, 11-334207, 2000-43423, 2000-108513, and 2000-158818.

The recording substance is not limited to dyes, and organic compounds may be used. Examples of such a organic compound include a triazole compound, a triazine compound, a cyanine compound, a melocyanine compound, an aminobutadiene compound, a phthalocyanine compound, a cinnamic acid compound, a viologen compound, an azo compound, an oxonolbenzoxazole compound, and a benzotriazole compound. Among these compounds, the cyanine compound, the aminobutadiene compound, the benzotriazole compound, and the phthalocyanine compound are particularly preferable.

The recording layer is formed by: preparing coating solution by dissolving a recording substance such as the aforementioned dye and a binder and the like in an appropriate solvent; forming a coating film by coating the coating solution on a light reflecting layer, which has been formed on the substrate surface; and drying the coating film. The concentration of the recording substance in the coating solution is generally in a range of 0.01% to 15% by mass, preferably in a range of 0.1% to 10% by mass, more preferably in a range of 0.5% to 5% by mass, and most preferably 0.5% to 3% by mass.

Examples of the solvent usable for the coating solution include esters such as butyl acetate, ethyl lactate, and cellosolve acetate; ketones such as methyl ethyl ketone, cyclohexanone, and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether, and dioxane; alcohols such as ethanol, n-propanol, isopropanol, n-butanol, and diacetone alcohol; fluorine-base solvents such as 2,2,3,3-tetrafluoropropanol; glycol ethers such as ethylene glycol monomethyl ether, ethylene glycol monoethyl ether, and propylene glycol monomethyl ether.

These solvents may be used solely or in combination of two or more types thereof, in consideration of solubility of a recording substance to be used. Further, various additives, such as an antioxidant, a UV absorber, a plasticizer, and a lubricant may be appropriately included in the coating solution depending on the application purpose.

In a case where the binder is used, examples thereof include natural organic polymer substances such as gelatin, a cellulose derivative, dextran, rosin, and rubber; synthetic organic polymers such as hydrocarbon-base resins such as a polyethylene, a polypropylene, a polystyrene, and a polyisobutylene; vinyl-base resins such as a polyvinyl chloride, a polyvinylidene chloride, and a polyvinyl chloride-polyvinyl acetate copolymer; acrylic resins such as methyl polyacrylate and methyl polymethacrylate; a polyvinyl alcohol, a chlorinated polyethylene, an epoxy resin, a butyral resin, a rubber derivative, and an initial condensate of heat-curable resins such as a phenol-formaldehyde resins. When the binder is included in the material of the recording layer, the amount of the binder to be added is 0.01 to 50 times (mass ratio) as much as the amount of the recording substance, and preferably 0.1 to 5 times (mass ratio) as much as the amount of the recording substance. The concentration of the recording substance in the coating solution thus prepared is generally in a range of 0.01% to 10% by mass and preferably in a range of 0.1% to 5% by mass.

Examples of the aforementioned coating process include spraying, spin coating, dip coating, roll coating, blade coating, doctor roll coating, and screen printing. The recording layer may be a single layer or multi-layers. The thickness of the recording layer is generally in a range of 20 nm to 500 nm, preferably in a range of 30 nm to 300 nm, and more preferably in a range of 50 nm to 100 nm.

Various types of anti-color fading agents may be included in the recording layer, in order to improve the resistance to light, of the recording layer.

As the anti-color fading agent, a singlet oxygen quencher is generally used. Examples of the singlet oxygen quencher include those disclosed in publications such as laid-open patent applications.

Specific examples of the quencher include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492, Japanese Patent Publication (JP-B) Nos. 1-38680 and 6-26028; German Patent No. 350399; and Nihon Kagakukaishi (The Chemical Society of Japan), October 1992, pp. 1141.

The amount of the anti-color fading agent such as the singlet oxygen quencher is generally in a range of 0.1% to 50% by mass, preferably in a range of 0.5% to 45% by mass, more preferably in a range of 3% to 40% by mass, and particularly preferably in a range of 5% to 25% by mass with respect to the amount of dye.

(Adhesive Layer)

The adhesive layer represents any layer which is formed in order to improve the adhesion between the recording layer and the covering layer described below.

As a material for forming the adhesive layer, a photo-curable resin is preferable. A resin which exhibits relatively little shrinkage after curing is particularly preferable, in terms of preventing warpage of the disc. Examples of the photo-curable resin of such a type as described above include UV-curable resins (UV-curable adhesives), such as "SD-640" and "SD-347" manufactured by Dainippon Ink and Chemicals, Incorporated. In order to make the adhesive layer elastic, the thickness thereof is preferably in a range of 1 μm to 1,000 μm, more preferably in a range of 5 μm to 500 μm, and particularly preferably in a range of 10 μm to 100 μm.

The adhesive described above does not need to be applied when an adhesive is pre-applied to an adhesion surface of a covering sheet used as the covering layer.

(Covering Layer)

The covering layer is formed to prevent the interior of the optical information recording medium from external shocks and the like. The material of the layer is not limited to a specific material as long as the material is transparent. The material is preferably polycarbonate, cellulose triacetate or the like and more preferably a material having a moisture absorption coefficient of 5% or lower at 23° C. and 50% RH.

The term "transparent" in the above-described case represents a state of a material in which the material allows the recording light and replaying light to pass through the material (with a transmittance of 90% or higher).

The covering layer is formed by: preparing a coating solution by dissolving a photo-curable resin for forming an adhesive layer in an appropriate solvent; coating the coating solution on the recording layer at a predetermined temperature, thereby forming a coating film; laminating, on the coating film, a cellulose triacetate film (TAC film) or the like, which has been obtained through an extrusion process of the plastic; and irradiating light on the laminated TAC film, thereby curing the coating film. The TAC film preferably contains a UV-ray absorber. The thickness of the covering layer is generally in a range of 0.01 mm to 0.2 mm, preferably in a range of 0.03 mm to 0.1 mm, and more preferably in a range of 0.05 mm 0.095 mm.

In the aforementioned case, a polycarbonate sheet may be used as the cover sheet.

In terms of viscosity control, the coating temperature is preferably in a range of 23° C. to 50° C., more preferably in a range of 24° C. to 40° C., and further more preferably in a range of 25° C. to 37° C.

It is preferable that the coating film is irradiated with UV light by using a pulse-type light irradiation unit (preferably, a UV irradiation unit) to prevent warpage of the disc. The pulse recurrence interval is preferably no larger than one msec and more preferably no larger than one μsec. The quantity of light irradiation at one pulse is not specifically limited; however, it is preferably 3 kW/cm$^2$ or lower and more preferably 2 kW/cm$^2$ or lower.

The number of irradiation processes is not specifically limited; however, it is preferably 20 or less and more preferably 10 or less.

In the optical information recording medium of the present invention, a dielectric layer or a light transmission layer may be formed between the light reflecting layer and the recording layer depending on the characteristics of the recording layer. The dielectric layer may be formed using an oxide, a nitride, a carbide, a sulfide, and the like composed of at least one type of elements selected from the group consisting of Zn, Si, Ti, Te, Sm, Mo, Ge, and the like. The dielectric layer may be formed as a hybrid of an oxide, a nitride, a carbide, a sulfide and the like, such as $ZnS—SiO_2$.

Any material may be used to form the light transmission layer, without being specific restriction, as long as the material has a transmittance of 90% or higher in terms of laser wavelength. For example, a material similar to that of the dielectric layer may be used.

The dielectric layer or the light transmission layer may be formed employing a known conventional process. The thickness of the dielectric layer is preferably in a range of 1 nm to 100 nm. The thickness of the light transmission layer is preferably in a range of 1 nm to 100 nm.

The optical information recording medium of the present invention, which is obtained by recording information on the aforementioned optical information recording medium, by using the method of recording optical information of the present invention, has a recording strategy of information different from the conventional types, whereby, inter-symbol interference is reduced and thus, in particular, superior jitter property is achieved.

EXAMPLES

Hereinafter, the present invention will be described in more detail with reference to an example. However, it is to be understood that the invention is not limited by the example.

[Production of Optical Information Recording Medium]

A reflecting layer (thickness: 100 nm) made from Ag was formed on a surface, on which grooves had been formed, of a substrate which was made from polycarbonate resin and formed by an injection molding process, in Ar atmosphere and by DC sputtering (with "Cube" manufactured by Unaxis Co. Ltd.).

The substrate had a thickness of 1.1 mm, an outer diameter of 120 mm, and an inner diameter of 15 mm; and had spiral grooves (groove depth: 30 nm; groove width: 150 nm; track pitch: 340 nm). The groove slope angle as measured by an AFM was 57°.

2 g of a dye represented by the chemical formula shown below was added in 100 ml of a 2,2,3,3-tetrafluoropropanol and dissolved therein, whereby a dye coating solution was prepared (in the chemical formula, "Rn" represents $\alpha$-$SO_2C_4H_9$, and "M" represents Cu.). The dye coating solution thus prepared was coated on a reflecting layer by spin coating, while the rotation speed was varied from 300 to 4,000 rpm, under a condition of 23° C. and 50% RH. Thereafter, the product was left for one hour in the condition of 23° C. and 50% RH, whereby a recording layer was formed (thickness at a groove (i.e., an in-groove) portion: 100 nm; thickness at a land (i.e., an on-groove) portion: 70 nm).

After the recording layer was formed, an annealing process was performed therefor by using a clean oven. The annealing process was performed at 40° C. for one hour such that the substrate was held on a vertical stack pole with a spacer.

Thereafter, a barrier layer (thickness: 5 nm) made from $ZnS/SiO_2$ ($ZnS:SiO_2$=8:2 (mass ratio)) was formed by an RF sputtering on the recording layer, and a laminate was produced (the laminate production step). The conditions in which the barrier layer was formed were set as follows:

Power: 4 kW

Pressure: $2 \times 10^{-2}$ hPa

Time: 2 seconds

A cover sheet made of polycarbonate having an adhesion surface on which an adhesive had been provided was adhered on the barrier layer produced as the laminate, whereby an optical information recording medium was produced.

The total of the thicknesses of the covering layer (covering layer) and the adhesive layer of the produced optical information recording medium was approximately 100 μm.

Example 1

Using the optical information recording medium produced as described above, information was recorded and replayed.

Waveforms as shown in FIGS. 2A to 2C were used as the recording strategies when the information was recorded, and signals were transmitted using a PULSTEC MSG2. The clock frequency was set at 66 MHz, the linear velocity was set at 4.9 m/s, the recording power was set at 5.8 mW, and the replaying power was set at 0.5 mW. $T_{mp}$ was set at 0.7T, and the $T_{top}$ and $T_{lp}$ widths were set as shown in Table 1-1 and Table 1-2.

Figure 6:
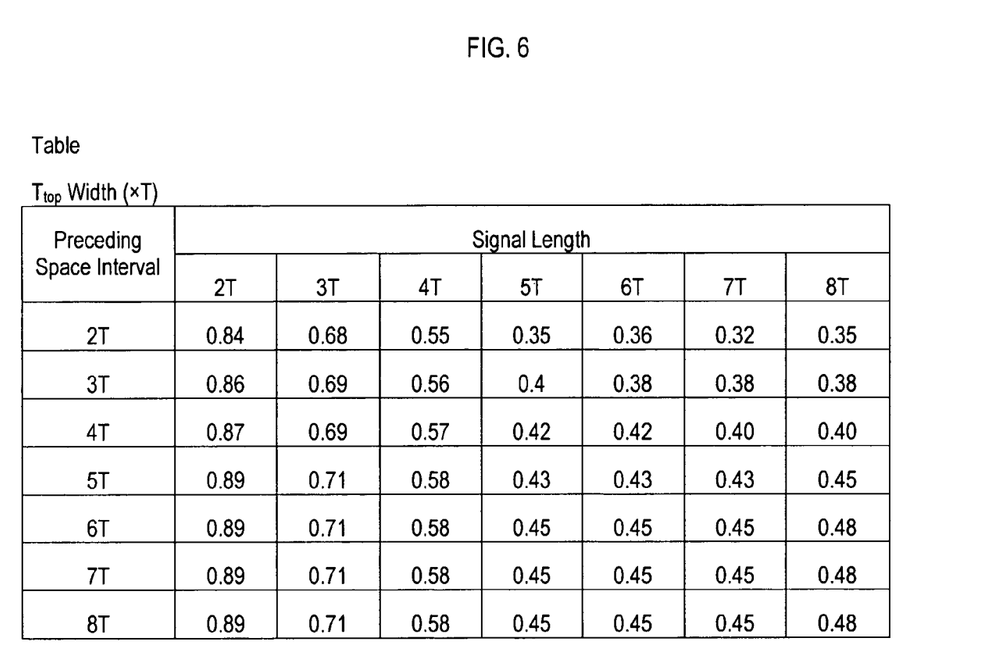
FIG. 6 illustrates a range of values for a top pulse according to an embodiment of the invention.

Table 1-1, for example, shows that the $T_{top}$ value of a 2T signal after a 2T interval was 0.84T. Table 1-2 shows that the $T_{lp}$ value of a 3T signal before a 2T interval, for example, was 0.60T. As apparent from Table 1-1 below (also from FIG. 6), the $T_{top}$ values may span a range, with a preferably a width of a pulse having the shortest pulsewidth in range of 20%–70% of a width of top pulse having a longest pulsewidth.

The optical information recording medium in which the information had been recorded was then replayed, and jitter was measured. The measurement value of jitter was 10%.

TABLE 1-1

| Preceding Space Interval | $T_{top}$ Width (×T) Signal Length | | | | | | |
|---|---|---|---|---|---|---|---|
| | 2T | 3T | 4T | 5T | 6T | 7T | 8T |
| 2T | 0.84 | 0.68 | 0.55 | 0.35 | 0.36 | 0.32 | 0.35 |
| 3T | 0.86 | 0.69 | 0.56 | 0.4 | 0.38 | 0.38 | 0.38 |
| 4T | 0.87 | 0.69 | 0.57 | 0.42 | 0.42 | 0.40 | 0.40 |
| 5T | 0.89 | 0.71 | 0.58 | 0.43 | 0.43 | 0.43 | 0.45 |
| 6T | 0.89 | 0.71 | 0.58 | 0.45 | 0.45 | 0.45 | 0.48 |
| 7T | 0.89 | 0.71 | 0.58 | 0.45 | 0.45 | 0.45 | 0.48 |
| 8T | 0.89 | 0.71 | 0.58 | 0.45 | 0.45 | 0.45 | 0.48 |

TABLE 1-2

| Subsequent Space Interval | $T_{lp}$ Width (×T) Signal Length | | | | | | |
|---|---|---|---|---|---|---|---|
| | 2T | 3T | 4T | 5T | 6T | 7T | 8T |
| 2T | — | 0.60 | 0.55 | 0.56 | 0.55 | 0.59 | 0.60 |
| 3T | — | 0.59 | 0.51 | 0.53 | 0.52 | 0.56 | 0.58 |
| 4T | — | 0.58 | 0.51 | 0.52 | 0.52 | 0.55 | 0.58 |
| 5T | — | 0.59 | 0.51 | 0.52 | 0.52 | 0.55 | 0.58 |
| 6T | — | 0.58 | 0.51 | 0.52 | 0.52 | 0.55 | 0.58 |
| 7T | — | 0.58 | 0.51 | 0.52 | 0.52 | 0.55 | 0.58 |
| 8T | — | 0.58 | 0.51 | 0.52 | 0.52 | 0.55 | 0.58 |

Example 2

Example 2 was carried out in a manner similar to that of example 1, except that the width of each multipulse was set at 0.75T, the recording power was set at 5.5 mW, and the recording power was adjusted in units of 0.1 mW so that jitter was made minimum.

The information thus recorded on the optical information recording medium was reproduced, and jitter was measured. The measurement value was 10%.

Example 3

Example 3 was carried out in a manner similar to that of example 1, except that the width of each multipulse is set at 0.65T, and the recording power was set at 6 mW.

The information recorded on the optical information recording medium was reproduced, and jitter was measured. The measurement value was 10%.

Example 4

Example 4 was carried out in a manner similar to that of example 1, except that the widths of $T_{top}$ and $T_{lp}$ were set as shown in Tables 2-1 and 2-2, respectively, and the recording power was set at 5.8 mW.

The information thus recorded in the optical information recording medium was reproduced, and jitter was measured. The measurement value was 11%.

TABLE 2-1

| Preceding Space Interval | $T_{top}$ Width (×T) Signal Length | | | | | | |
|---|---|---|---|---|---|---|---|
| | 2T | 3T | 4T | 5T | 6T | 7T | 8T |
| 2T | 0.84 | 0.68 | 0.55 | 0.35 | 0.36 | 0.32 | 0.35 |
| 3T | 0.86 | 0.69 | 0.56 | 0.4 | 0.38 | 0.38 | 0.38 |
| 4T | 0.87 | 0.69 | 0.57 | 0.42 | 0.42 | 0.40 | 0.40 |
| 5T | 0.89 | 0.71 | 0.58 | 0.43 | 0.43 | 0.43 | 0.45 |
| 6T | 0.89 | 0.71 | 0.58 | 0.45 | 0.45 | 0.45 | 0.48 |
| 7T | 0.89 | 0.71 | 0.58 | 0.45 | 0.45 | 0.45 | 0.48 |
| 8T | 0.89 | 0.71 | 0.58 | 0.45 | 0.45 | 0.45 | 0.48 |

TABLE 2-2

| Subsequent Space Interval | $T_{lp}$ Width (×T) Signal Length | | | | | | |
|---|---|---|---|---|---|---|---|
| | 2T | 3T | 4T | 5T | 6T | 7T | 8T |
| 2T | — | 0.58 | 0.51 | 0.52 | 0.52 | 0.55 | 0.58 |
| 3T | — | 0.58 | 0.51 | 0.52 | 0.52 | 0.55 | 0.58 |
| 4T | — | 0.58 | 0.51 | 0.52 | 0.52 | 0.55 | 0.58 |
| 5T | — | 0.58 | 0.51 | 0.52 | 0.52 | 0.55 | 0.58 |
| 6T | — | 0.58 | 0.51 | 0.52 | 0.52 | 0.55 | 0.58 |
| 7T | — | 0.58 | 0.51 | 0.52 | 0.52 | 0.55 | 0.58 |
| 8T | — | 0.58 | 0.51 | 0.52 | 0.52 | 0.55 | 0.58 |

Example 5

Example 5 was carried out in a manner similar to that of example 1, except that the widths of $T_{top}$ and $T_{lp}$ were set as shown in Tables 3-1 and 3-2, respectively, and the recording power was set at 5.5 mW.

The information thus recorded in the optical information recording medium was reproduced, and jitter was measured. The measurement value was 13%.

TABLE 3-1

| Preceding Space Interval | $T_{top}$ Width (×T) Signal Length | | | | | | |
|---|---|---|---|---|---|---|---|
| | 2T | 3T | 4T | 5T | 6T | 7T | 8T |
| 2T | 0.89 | 0.71 | 0.58 | 0.45 | 0.45 | 0.45 | 0.48 |
| 3T | 0.89 | 0.71 | 0.58 | 0.45 | 0.45 | 0.45 | 0.48 |
| 4T | 0.89 | 0.71 | 0.58 | 0.45 | 0.45 | 0.45 | 0.48 |
| 5T | 0.89 | 0.71 | 0.58 | 0.45 | 0.45 | 0.45 | 0.48 |
| 86T | 0.89 | 0.71 | 0.58 | 0.45 | 0.45 | 0.45 | 0.48 |
| 7T | 0.89 | 0.71 | 0.58 | 0.45 | 0.45 | 0.45 | 0.48 |
| 8T | 0.89 | 0.71 | 0.58 | 0.45 | 0.45 | 0.45 | 0.48 |

TABLE 3-2

| Subsequent Space Interval | $T_{lp}$ Width (×T) Signal Length | | | | | | |
|---|---|---|---|---|---|---|---|
| | 2T | 3T | 4T | 5T | 6T | 7T | 8T |
| 2T | — | 0.60 | 0.55 | 0.56 | 0.55 | 0.59 | 0.60 |
| 3T | — | 0.59 | 0.51 | 0.53 | 0.52 | 0.56 | 0.58 |
| 4T | — | 0.58 | 0.51 | 0.52 | 0.52 | 0.55 | 0.58 |
| 5T | — | 0.59 | 0.51 | 0.52 | 0.52 | 0.55 | 0.58 |
| 6T | — | 0.58 | 0.51 | 0.52 | 0.52 | 0.55 | 0.58 |
| 7T | — | 0.58 | 0.51 | 0.52 | 0.52 | 0.55 | 0.58 |
| 8T | — | 0.58 | 0.51 | 0.52 | 0.52 | 0.55 | 0.58 |

Comparative Example 1

Comparative example 1 was carried out in a manner similar to that of example 1, except that the widths of $T_{top}$ and $T_{lp}$ were set as shown in Tables 4-1 and 4-2.

The information thus recorded in the optical information recording medium was reproduced. The measurement of jitter was attempted, but it turned out that measurement was impossible because jitter was out of the measurable range.

TABLE 4-1

| Preceding Space Interval | $T_{top}$ Width (×T) Signal Length | | | | | | |
|---|---|---|---|---|---|---|---|
| | 2T | 3T | 4T | 5T | 6T | 7T | 8T |
| 2T | 1.2 | 1.2 | 1.2 | 1.2 | 1.2 | 1.2 | 1.2 |
| 3T | 1.2 | 1.2 | 1.2 | 1.2 | 1.2 | 1.2 | 1.2 |
| 4T | 1.2 | 1.2 | 1.2 | 1.2 | 1.2 | 1.2 | 1.2 |
| 5T | 1.2 | 1.2 | 1.2 | 1.2 | 1.2 | 1.2 | 1.2 |
| 6T | 1.2 | 1.2 | 1.2 | 1.2 | 1.2 | 1.2 | 1.2 |
| 7T | 1.2 | 1.2 | 1.2 | 1.2 | 1.2 | 1.2 | 1.2 |
| 8T | 1.2 | 1.2 | 1.2 | 1.2 | 1.2 | 1.2 | 1.2 |

TABLE 4-2

| Subsequent Space Interval | $T_{lp}$ Width (×T) Signal Length | | | | | | |
|---|---|---|---|---|---|---|---|
| | 2T | 3T | 4T | 5T | 6T | 7T | 8T |
| 2T | — | 0.60 | 0.55 | 0.56 | 0.55 | 0.59 | 0.60 |
| 3T | — | 0.59 | 0.51 | 0.53 | 0.52 | 0.56 | 0.58 |
| 4T | — | 0.58 | 0.51 | 0.52 | 0.52 | 0.55 | 0.58 |
| 5T | — | 0.59 | 0.51 | 0.52 | 0.52 | 0.55 | 0.58 |
| 6T | — | 0.58 | 0.51 | 0.52 | 0.52 | 0.55 | 0.58 |
| 7T | — | 0.58 | 0.51 | 0.52 | 0.52 | 0.55 | 0.58 |
| 8T | — | 0.58 | 0.51 | 0.52 | 0.52 | 0.55 | 0.58 |

As described above, according to the invention, there can be provided: an optical information recording method of forming pits of steady shapes and reducing jitter of a reproduced signal in a high-recording-density optical information recording medium that has track pitches narrower than conventional DVD; and an optical information recording medium containing information recorded by the optical information recording method.

What is claimed is:

1. An optical information recording method of recording information on an optical information recording medium by irradiation of laser beam, the method being for only write-once recording, and the method comprising the steps of:
    forming a recording waveform which forms a first pit having a shortest pit length, by
    using a top pulse having a width narrower than a width of a channel clock cycle;
    forming a recording waveform which forms a second pit that is second shortest following the first pit, by using the top pulse and a terminal pulse having a width narrower than the width of the channel clock cycle; and
    forming a recording waveform which forms a pit that is longer than the second pit, by using the top pulse, the terminal pulse, and at least one multipulse formed between the top pulse and the terminal pulse,
    wherein, among top pulses of pits, a width of a top pulse having a shortest pulsewidth is in a range of 20% to 70% of a width of a top pulse having a longest pulsewidth, and wherein, when "L" represents an interval between pits to be formed, a width of one top pulse, immediately before which a width of the interval L is shortest among the intervals, is in a range of 1% to 50% of a width of another top pulse, immediately before which a width of the interval L is longest among the intervals.

2. The optical information recording method according to claim 1, further comprising a step of setting a total number of the top pulse, the terminal pulse, and the at least one multipulse at n−1, when a pit having a pit length of nT is formed, wherein "n" represents an integer in a range from 2 to 8 and "T" represents the channel clock cycle.

3. The optical information recording method according to claim 1, wherein, when "L" represents an interval between pits to be formed, a width of a terminal pulse of a pit immediately before a smallest interval L is in a range of 1% to 50% of a width of a terminal pulse of another pit immediately before a largest interval L.

4. The optical information recording method according to claim 1, wherein the width of the top pulse is in a range of 0.1T to 0.9T, wherein "T" represents the channel clock cycle.

5. The optical information recording method according to claim 1, wherein a width of each of the at least one multipulse is in a range of 0.4T to O.84T, wherein "T" represents the channel clock cycle.

6. The optical information recording method according to claim 1, wherein a width of the terminal pulse is in a range of 0.1T to 0.8T, wherein "T" represents the channel clock cycle.

7. An optical information recording method of recording information on an optical information recording medium by irradiation of a laser beam, the method being for only write-once recording, and the method comprising the steps of:
    forming a pit having a pit length of nT, wherein "n" represents an integer greater than or equal to 2 and "T" represents a channel clock cycle; and
    forming a top pulse of a recording waveform which forms said pit, such that a width of the top pulse is narrower than T,
    wherein, among top pulses of the pits, a width of a top pulse having a shortest pulsewidth is in a range of 20% to 70% of a width of a top pulse having a longest pulsewidth, wherein, when "L" represents an interval between pits to be formed, a width of a top pulse of a pit immediately after a smallest interval L is in a range of 1% to 50% of a width of a top pulse of another pit immediately after a largest interval L.

8. The optical information recording method according to claim 7, further comprising a step of forming a terminal pulse of the recording waveform which forms said pit, such that a width of the terminal pulse is narrower than T.

9. The optical information recording method according to claim 8, further comprising a step of forming at least one multipulse so as to have a width narrower than T, the at least one multipulse being formed between the top pulse and the terminal pulse.

10. The optical information recording method according to claim 9, further comprising a step of setting the total number of the top pulse, the terminal pulse, and the at least one multipulse at n−1.

11. The optical information recording method according to claim 9, wherein, when "L" represents an interval between pits to be formed, a width of a terminal pulse of a pit immediately before a smallest interval L is in a range of 1% to 50% of a width of a terminal pulse of another pit immediately before a largest interval L.

12. The optical information recording method according to claim 9, wherein the width of the top pulse is in a range of 0.1T to 0.9T.

13. The optical information recording method according to claim 9, wherein the width of each of the at least one multipulse is in a range of 0.4T to 0.84T.

14. The optical information recording method according to claim 8, wherein the width of the terminal pulse is in a range of 0.1T to 0.8T.

15. An optical information recording medium containing information recorded by the optical information recording method according to claim 1.

16. An optical information recording medium containing information recorded by the optical information recording method according to claim 7.

17. The optical information recording method according to claim 1, wherein the top pulse corresponding to the second pit is a first pulse of the recording waveform.

18. The optical information recording method according to claim 17, wherein the terminal pulse corresponding to the second pit is an end pulse of the recording waveform.

19. The optical information recording method according to claim 1, wherein the top pulse corresponding to the pit that is longer than the second pit is a first pulse of the recording waveform.

20. The optical information recording method according to claim 19, wherein the terminal pulse corresponding to the pit that is longer than the second pit is an end pulse of the recording waveform.

21. The optical information recording method according to claim 7, wherein the top pulse is a first pulse of the recording waveform.

22. The optical information recording method according to claim 8, wherein the terminal pulse is an end pulse of the recording waveform.

* * * * *